(12) United States Patent
Wang et al.

(10) Patent No.: US 8,240,905 B2
(45) Date of Patent: Aug. 14, 2012

(54) LIGHT SOURCE ASSEMBLY

(75) Inventors: Te-Hsu Wang, Miao-Li (TW);
Ming-Chuan Li, Miao-Li (TW);
Zhao-Yu Wang, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 0 days.

(21) Appl. No.: 13/172,852

(22) Filed: Jun. 30, 2011

(65) Prior Publication Data

US 2011/0267818 A1    Nov. 3, 2011

Related U.S. Application Data

(62) Division of application No. 12/231,498, filed on Sep. 2, 2008, now Pat. No. 7,990,492.

(30) Foreign Application Priority Data

Aug. 31, 2007  (CN) .................. 2007 2 0122572 U

(51) Int. Cl.
*F21V 7/04* (2006.01)
(52) U.S. Cl. .............. 362/612; 362/249.02; 362/621; 362/800; 349/65
(58) Field of Classification Search .......... 362/249.02, 362/612, 621, 800; 349/63, 65, 69
See application file for complete search history.

(56) References Cited

U.S. PATENT DOCUMENTS

2007/0147080 A1 *  6/2007  Wu et al. ............... 362/612
* cited by examiner

*Primary Examiner* — Jason Moon Han
(74) *Attorney, Agent, or Firm* — WPAT, PC; Justin King

(57) ABSTRACT

An exemplary light source assembly includes a light guide plate, a printed circuit board and light emitting elements. Each of the light emitting elements includes a cuneiform base and a light emitting diode. The cuneiform base includes an inclined surface sloped relative to an outer surface of the printed circuit board. The corresponding light emitting diode is placed on the inclined surface of the cuneiform base such that the light emitting diode is angled on the printed circuit board. Thereby, light is obliquely emitted from the light emitting elements onto the light guide plate.

18 Claims, 5 Drawing Sheets

LIGHT SOURCE ASSEMBLY

CROSS-REFERENCE TO RELATED APPLICATION

This application is a divisional application of U.S. patent application Ser. No. 12/231,498, filed Sep. 2, 2008 and entitled "LIQUID CRYSTAL DISPLAY AND DISPLAY DEVICE WITH LIGHT SOURCE ASSEMBLY." The disclosure of such parent application is incorporated herein by reference.

BACKGROUND

1. Technical Field

The present invention relates to light source assemblies and liquid crystal displays using the same.

2. Description of Related Art

Liquid crystal displays are commonly used as display devices for compact electronic apparatuses, because they not only provide good quality images but are also very thin and light. Referring to FIG. 5, a typical liquid crystal display 10 includes a first frame 11, a liquid crystal panel 12, a backlight module 13, light emitting diodes (LEDs) 15, a light holder 17, a printed circuit board 18, and a second frame 19. The first frame 11 defines an opening (not labeled). The first frame 11 and the second frame 19 cooperatively define an accommodating space to receive the liquid crystal panel 12, the backlight module 13, the LEDs 15, the light holder 17, and the printed circuit board 18. The liquid crystal panel 12 corresponds to the opening.

The LEDs 15 are located on the light holder 17. The light holder 17 bearing the LEDs 15 is adjacent to a side surface of the liquid crystal panel 12. The LEDs 15 face an inner surface of the first frame 11. The printed circuit board 18 is fixed between the light holder 17 and the second frame 19. The LEDs 15 are electrically connected to the printed circuit board 18 by wires. Light emitting from the LEDs 15 reaches the inner surface of the first frame 11 and generates a halo effect on the edge of the first frame 11.

The liquid crystal display 10 includes the light holder 17 to provide fixed locations for the LEDs 15. This complicates the assembly of the liquid crystal display 10. Furthermore, because the LEDs 15 emit light only within certain angles, a large number of LEDs 15 is needed to illuminate the edge of the first frame 11.

What is needed, therefore, is a light source assembly that can overcome the described limitations, as well as a liquid crystal display utilizing the light source assembly.

SUMMARY

In one exemplary embodiment, a light source assembly includes a light guide plate, a printed circuit board, and at least two light emitting elements. Each of the at least two light emitting elements includes a cuneiform base and a light emitting diode. Each of the cuneiform bases includes an inclined surface sloped relative to an outer surface of the printed circuit board. The corresponding light emitting diode is placed on the inclined surface of the cuneiform base such that the light emitting diode is angled on the printed circuit board. Thereby, light is obliquely emitted from the at least two light emitting elements onto the light guide plate.

Other novel features and advantages will become more apparent from the following detailed description when taken in conjunction with the accompanying drawings, in which:

DETAILED DESCRIPTION

Reference will now be made to the drawings to describe the preferred embodiments in detail.

Figure 1:
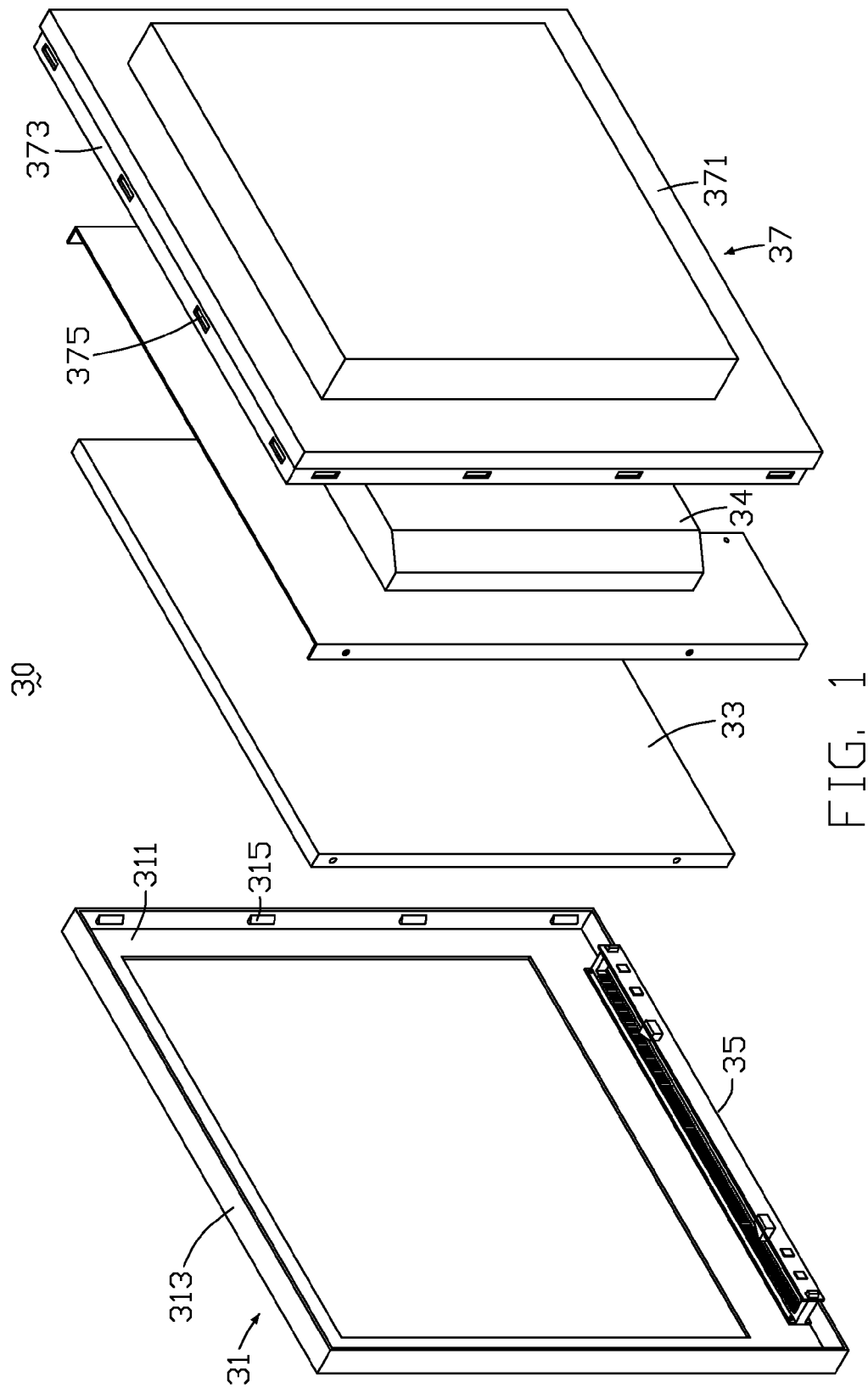
FIG. 1 is an exploded, isometric view of a liquid crystal display according to a preferred embodiment of the present invention, the liquid crystal display including a light source assembly.

Referring to FIG. 1, a liquid crystal display 30 according to a preferred embodiment of the present invention is shown. The liquid crystal display 30 includes a first frame 31, a liquid crystal panel 33, a backlight module 34, a light source assembly 35, and a second frame 37. The first frame 31 cooperates with the second frame 37 to form a space to receive the liquid crystal panel 33, the backlight module 34, and the light source assembly 35.

The first frame 31 is plastic, and includes a front wall 311, and four first side walls 313 connected end to end. The front wall 311 is perpendicularly connected with the first side walls 313. The front wall 311 defines an opening (not labeled) corresponding to the liquid crystal panel 33. Inner surfaces of the first side walls 313 include a plurality of hooks 315 extending inwardly.

The second frame 37 is plastic, and includes a back wall 371, and four second side walls 373 connected end by end. The back wall 371 is perpendicularly connected with the second side walls 373. The second side walls 373 define a plurality of grooves 375 corresponding to the hooks 315.

The liquid crystal panel 33 is adjacent to the front wall 311 of the first frame 31. A display region of the liquid crystal panel 33 corresponds to the opening of the first frame 31. The backlight module 34 is adjacent to the back wall 371 of the second frame 37. A side surface of the liquid crystal panel 33, an inner surface of the front wall 311, and an inner surface of the second side wall 373 cooperatively form a space to accommodate the light source assembly 35. The light source assembly 35 generates light to illuminate an edge of the front wall 311 of the first frame 31, generating an optical halo effect.

Figure 2:
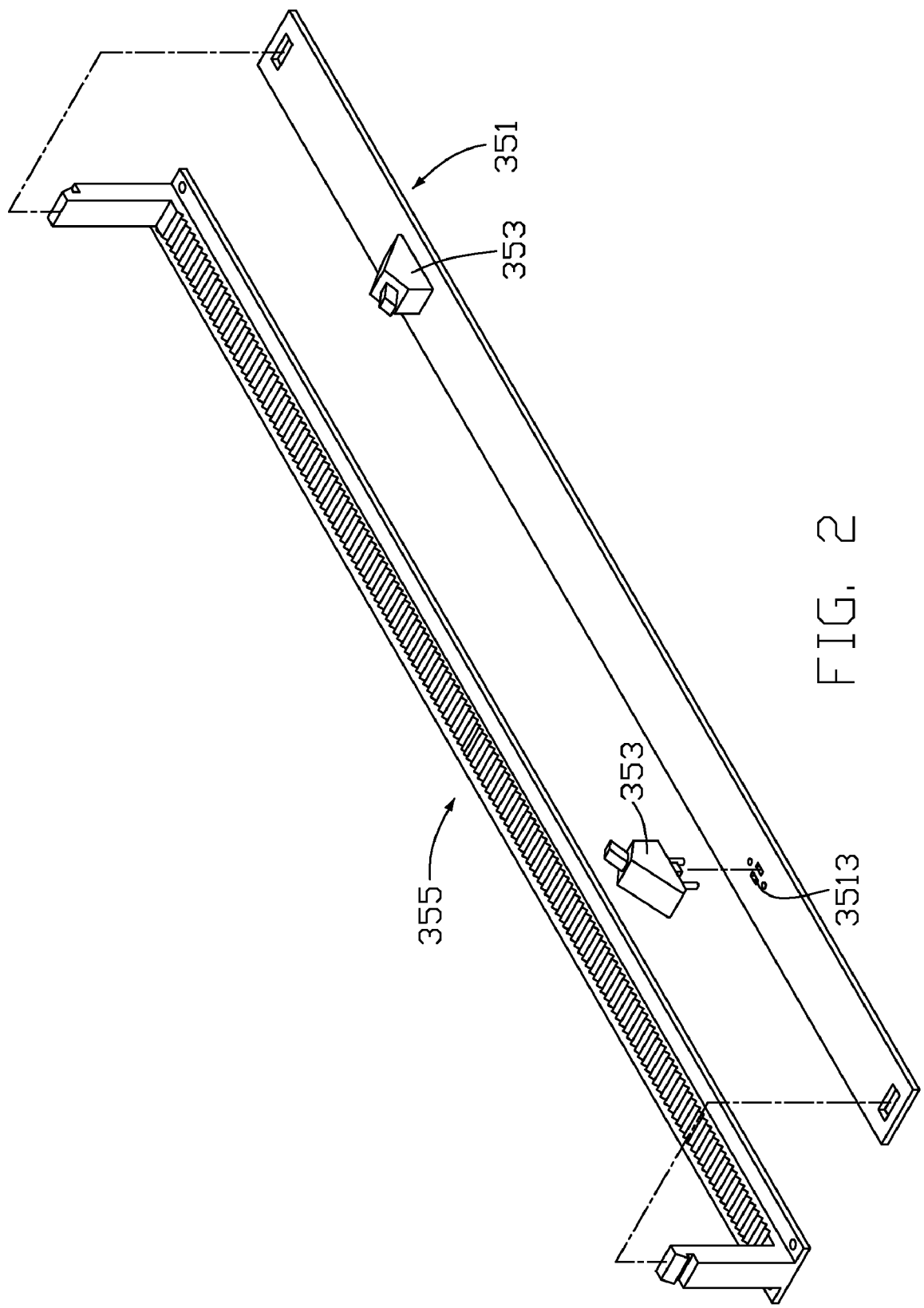
FIG. 2 is an exploded, isometric view of the light source assembly of FIG. 1, the light source assembly including two light emitting elements and a light guide plate.

Referring also to FIG. 2, the light source assembly 35 includes a printed circuit board 351, two light emitting elements 353, and a light guide plate 355. The printed circuit board 351 is adjacent to a second side wall 373 of the second frame 37. An outer surface of the printed circuit board 351 facing the first frame 31 is coated with reflective materials, and an inner surface of the printed circuit board 351 facing the second frame 37 includes a plurality of circuits. The printed circuit board 351 defines a plurality of slots 3513. The light emitting elements 353 are placed on the outer surface of the printed circuit board 351 and are fixed into the slot 3513.

Figure 3:
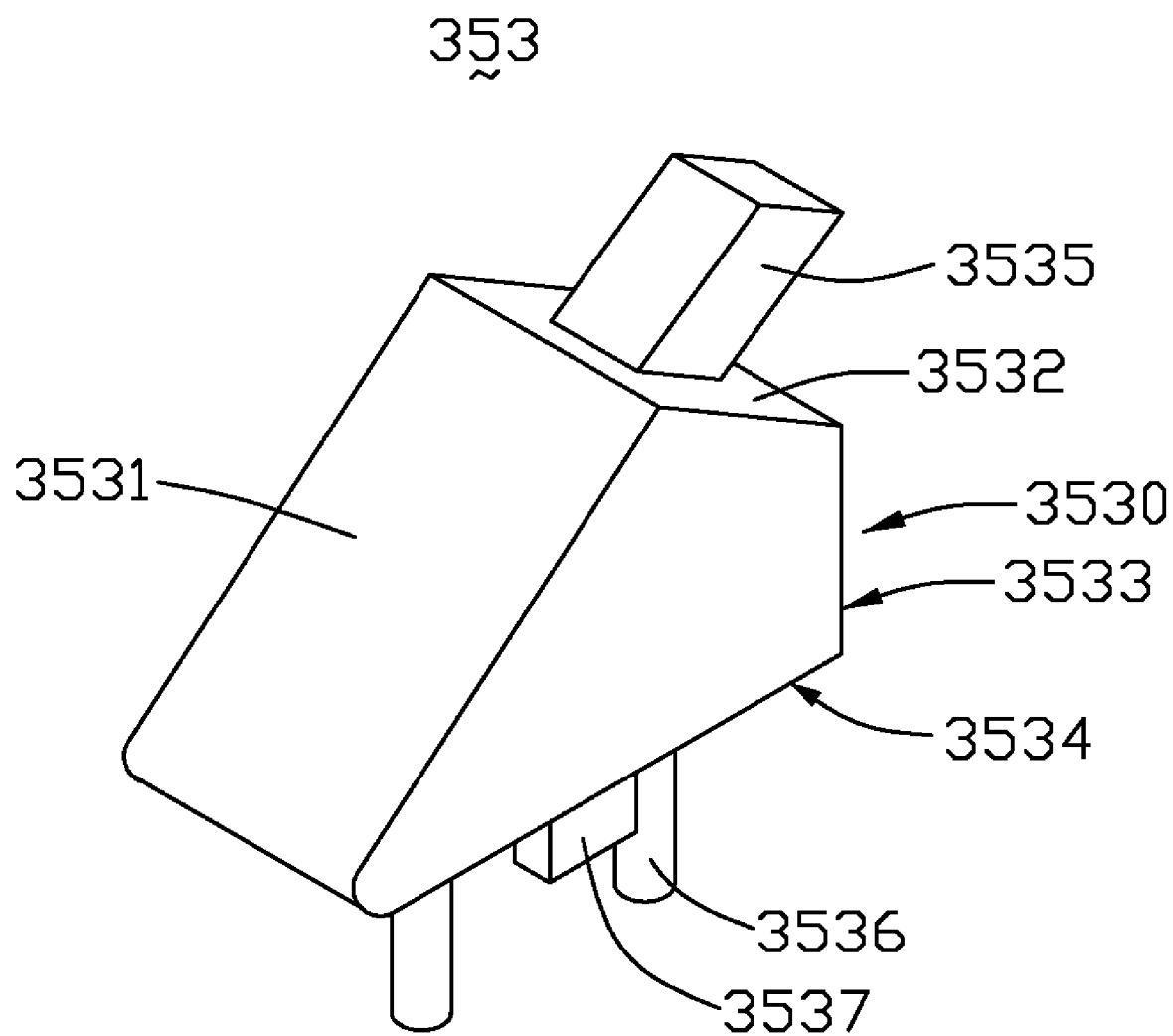
FIG. 3 is an enlarged view of one of the light emitting elements of FIG. 2.

Referring also to FIG. 3, each of the light emitting elements 353 includes a base 3530, and an LED 3535 located on the base 3530. The base 3530 is cuneiform, and is plastic. The base 3530 includes a first surface 3531, a second surface 3532, a third surface 3533, and a bottom surface 3534 connected end to end. The first surface 3531 and the bottom surface 3534 define an acute angle therebetween. The acute angle can be 35°. The first surface 3531 is perpendicularly connected to the second surface 3532. The third surface 3533 is perpendicularly connected to the bottom surface 3534. The LED 3535 is disposed on the second surface 3532 of the base 3530. Light emission from LED 3535 is maintained at an acute angle of 35° relative to the printed circuit board 351.

The bottom surface 3534 includes two poles 3536 and two electrodes 3537. The poles 3536 are configured to fix the base 3530 to the printed circuit board 351. The electrodes 3537 are plugged into two corresponding slots 3513 of the printed circuit board 351, and are configured to electrically connect the LED 3535 with the circuits on the printed circuit board 351. The bottom surface 3534 of the base 3530 remains close to the outer surface of the printed circuit board 351.

Figure 4:
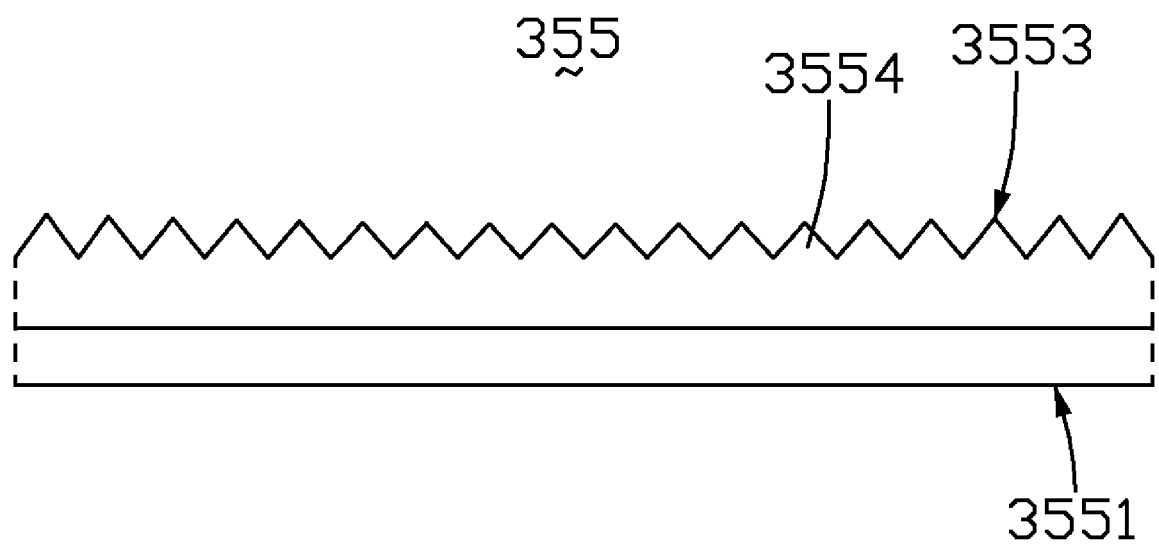
FIG. 4 is an enlarged, side plan view of part of the light guide plate of FIG. 2.
Figure 5:
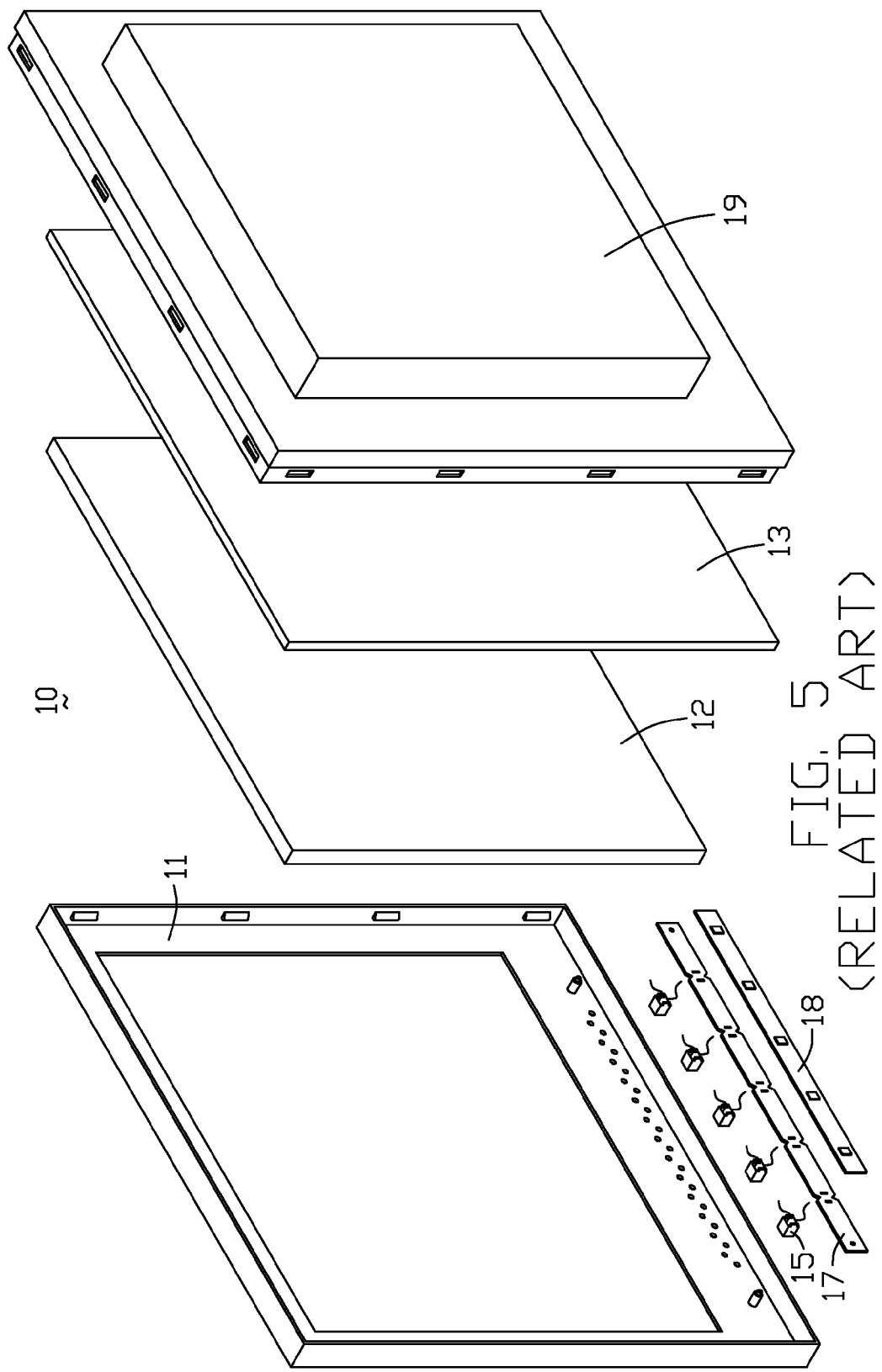
FIG. 5 is an exploded, isometric view of a conventional liquid crystal display.

Referring also to FIG. 4, the light guide plate 355 is acrylic. The light guide plate 355 includes a light emitting surface 3551 and a light incident surface 3553. The light incident surface 3553 includes a plurality of V-shaped protrusions 3554. A transverse section of each of the V-shaped protrusions 3554 is an equilateral triangle. Light is transmitted into the light guide plate 355 through the light incident surface 3553. The light exiting the light emitting surface 3551 maintains uniformity by control of the V-shaped protrusions 3554. When the liquid crystal display 30 is assembled, the light emitting surface 3551 is close to the front wall 311 of the first frame 31, and the light incident surface 3553 faces the printed circuit board 351. The light emitting element 353 is thus located between the light guide plate 355 and the printed circuit board 351.

In operation, the LEDs 3535 emit light at a maintained acute angle of 35° relative to the printed circuit board 351. The light is obliquely transmitted into the light guide plate 355 and exits the light emitting surface 3553. The V-shaped protrusions 3554 divert the light so that the light uniformly reaches the inner surfaces of the edge of the front wall 311. Thus, a halo effect is generated on the edge of the front wall 311, and an optical effect of the liquid crystal display 30 is improved. The angle between light emitted from the LEDs 3535 and the printed circuit board 351 is variable, according to any particular required optical effect.

Unlike conventional liquid crystal displays, the liquid crystal display 30 includes the light emitting elements 353 directly fixed on the printed circuit board 351, simplifying assembly. Furthermore, the angled disposition of the LEDs 3535 on the printed circuit board 351 results in obliquely emitted light that becomes incident on the light guide plate 355, thereby increasing the region on the light guide plate 355 illuminated. The number of LEDs 3535 deployed can thus be reduced, and the cost of the liquid crystal display 30 be decreased correspondingly. Additionally, the light guide plate 355 enhances the uniformity of light transmitted, thereby improving the quality of the optical effect of the light guide plate 355.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A light source assembly comprising:
   a light guide plate;
   a printed circuit board facing the light guide plate; and
   at least two light emitting elements, each comprising a cuneiform base and a light emitting diode placed on the cuneiform base, wherein the cuneiform base is fixed to the printed circuit board, and comprises a first surface, a second surface, a third surface and a bottom surface connected end by end, the bottom surface is adjacent to the printed circuit board, the first surface and the printed circuit board define an acute angle therebetween, the first surface perpendicularly connects with the second surface, and the third surface perpendicularly connects with the bottom surface, such that the light emitting elements are angled on the printed circuit board and light is obliquely emitted from the light emitting elements onto the light guide plate.

2. The light source assembly of claim 1, wherein the light emitting diode is placed on the second surface of the cuneiform base.

3. The light source assembly of claim 1, wherein each of the light emitting elements further comprises at least two electrodes on the cuneiform base, the at least two electrodes plugged into and electrically connected with the printed circuit board.

4. A light source assembly comprising:
   a light guide plate comprising a light incident surface;
   a printed circuit board comprising an outer surface, the outer surface facing the light incident surface of the light guide plate; and
   at least two light emitting elements, each of the light emitting elements comprising an electronic cuneiform base and a light emitting diode, wherein the cuneiform base comprises an inclined surface inclined to the outer surface of the printed circuit board, and the light emitting diode is placed on the inclined surface of the cuneiform base such that the light emitting diode is angled on the printed circuit board, whereby light is obliquely emitted from the light emitting elements onto the light guide plate.

5. The light source assembly of claim 4, wherein the printed circuit board comprises a plurality of slots, and each cuneiform base comprises at least two poles fixed in corresponding slots of the plurality of slots.

6. The light source assembly of claim 4, wherein each of the light emitting elements comprises at least two electrodes plugged into and electrically connected with the printed circuit board.

7. The light source assembly of claim 6, wherein the printed circuit board further comprises an inner surface, the inner surface and the outer surface are at opposite sides of the printed circuit board, a plurality of circuits is located on the inner surface, and the at least two electrodes of each light emitting element electrically connect the light emitting diode with the plurality of circuits on the printed circuit board.

8. The light source assembly of claim 4, wherein the outer surface of the printed circuit board is coated with reflective material.

9. The light source assembly of claim 4, wherein the light incident surface comprises a plurality of V-shaped protrusions.

10. The light source assembly of claim 4, wherein the cuneiform base further comprises a first surface, a second surface and a bottom surface, the first surface, the inclined surface, the second surface and the bottom surface are connected end to end, the bottom surface is adjacent to the printed circuit board, and the first surface and the printed circuit board define an acute angle therebetween.

11. The light source assembly of claim 10, wherein the acute angle is 35°.

12. The light source assembly of claim 10, wherein the first surface is perpendicularly connected with the inclined surface, and the second surface is perpendicularly connected with the bottom surface.

13. A light source assembly comprising:
- a light guide plate comprising a light incident surface and a light emitting surface at opposite sides thereof;
- a printed circuit board comprising an outer surface, the outer surface facing the light incident surface of the light guide plate; and
- at least two light emitting elements, each of the light emitting elements comprising an electronic cuneiform base and a light emitting diode,
- wherein the cuneiform base of each light emitting element comprises an inclined surface inclined to the outer surface of the printed circuit board, and the corresponding light emitting diode is placed on the inclined surface of the cuneiform base such that the light emitting diode is angled on the printed circuit board, whereby light is obliquely emitted from the light emitting elements onto the light guide plate.

14. The light source assembly of claim 13, wherein each of the light emitting elements comprises at least two electrodes plugged into and electrically connected with the printed circuit board, the printed circuit board further comprises an inner surface, the inner surface and the outer surface are at opposite sides of the printed circuit board, a plurality of circuits is located on the inner surface, and the at least two electrodes electrically connect the light emitting diode with the circuits on the printed circuit board.

15. The light source assembly of claim 13, wherein the outer surface of the printed circuit board is coated with reflective material.

16. The light source assembly of claim 13, wherein the light incident surface comprises a plurality of V-shaped protrusions.

17. The light source assembly of claim 13, wherein the cuneiform base further comprises a first surface, a second surface and a bottom surface, the first surface, the inclined surface, the second surface and the bottom surface are connected end to end, the bottom surface is adjacent to the printed circuit board, and the first surface and the printed circuit board define an acute angle therebetween.

18. The light source assembly of claim 17, wherein the first surface is perpendicularly connected with the inclined surface, and the second surface is perpendicularly connected with the bottom surface.

* * * * *